June 3, 1930. T. MIDGLEY 1,760,880
EXPANDING FLAT BAND TIRE CASING
Filed Feb. 15, 1926   3 Sheets-Sheet 1
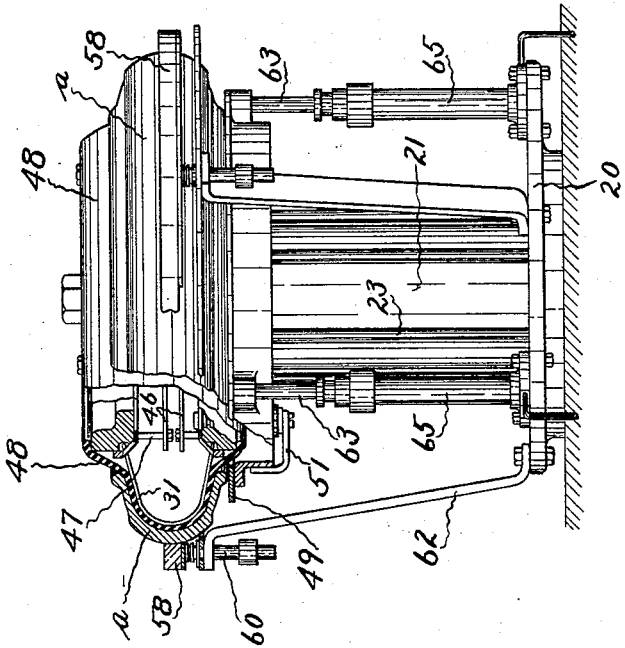
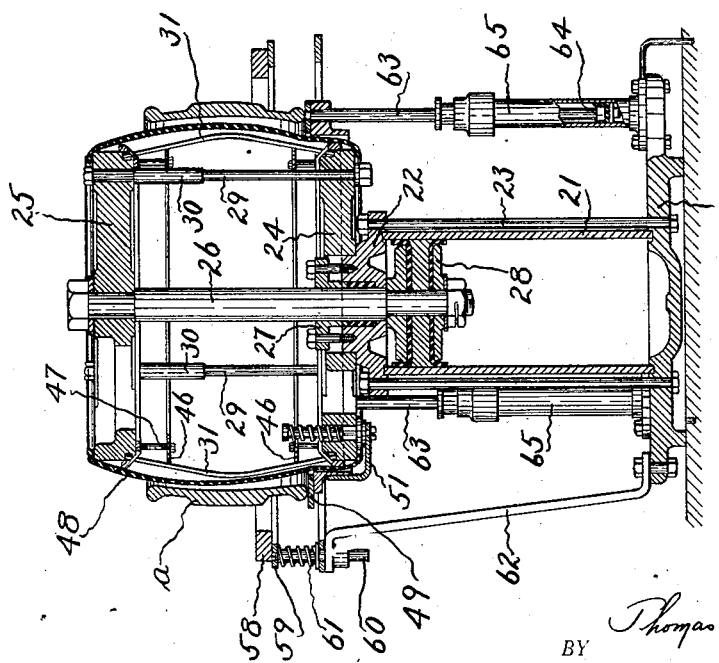
INVENTOR.
Thomas Midgley
BY
Edward C. Taylor
ATTORNEY.

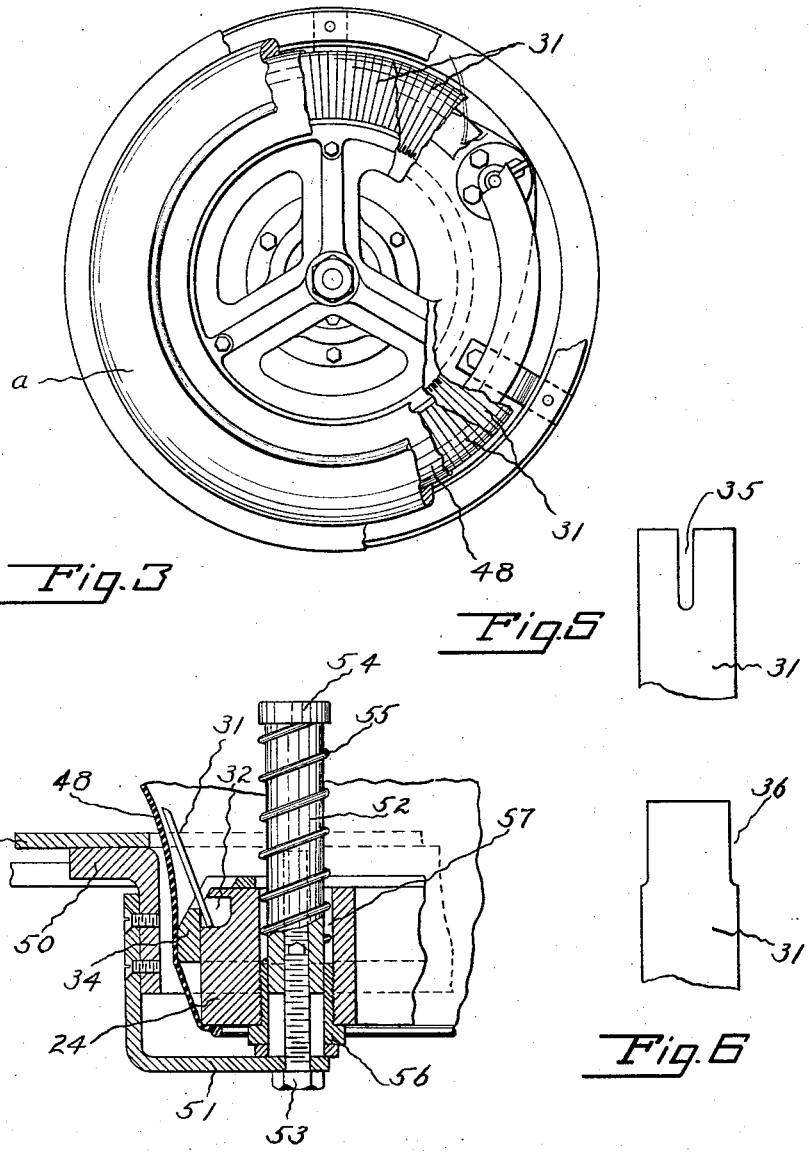

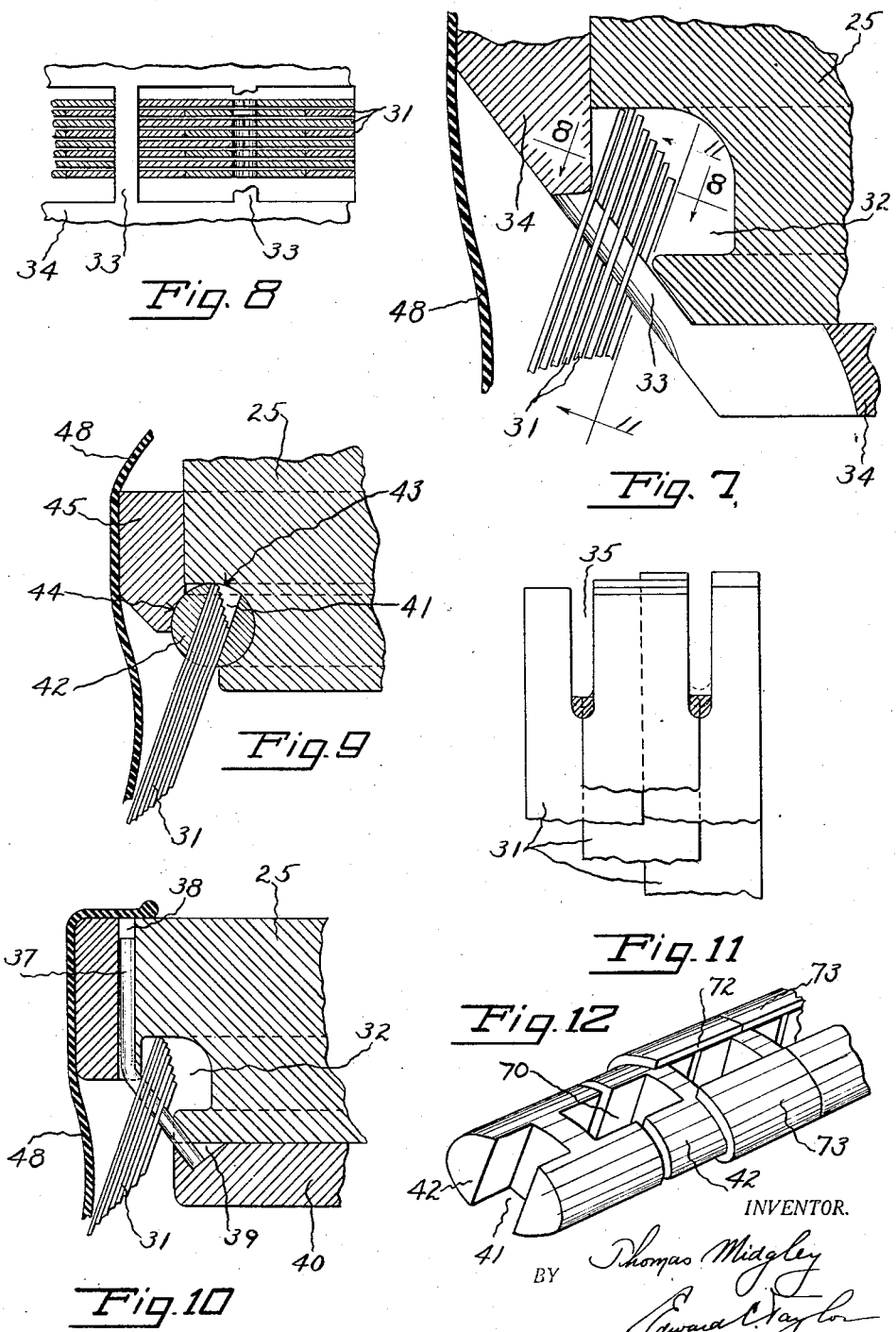

Patented June 3, 1930

1,760,880

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

EXPANDING FLAT-BAND TIRE CASING

Application filed February 15, 1926. Serial No. 88,194.

This invention relates to a machine for expanding flat band casings to tire form and for holding the casing expanded so as to facilitate the insertion of a fluid pressure bag. It also relates to a method of preparing the casing for the insertion of a fluid pressure bag.

The objects of the invention are to produce a machine which will act positively upon the flat band casing to insure its even expansion at all points, which will work with great rapidity, and which will be smooth in its action upon the casing so as to avoid the unevenness present in previously constructed mechanical expanders. Another object is to facilitate the insertion of a fluid pressure bag within the expanded casing. In certain aspects the machine is an improvement on that shown in the patent to Lewis 1,473,822, particularly in the smoothing out of the action of the mechanical expanding elements upon the tire material.

Referring to the drawings,

Fig. 1 is a vertical section through an expander constructed in accordance with my invention, showing a flat band casing in place ready for the expanding operation;

Fig. 2 is a side elevation, partly in section, showing the machine in its expanded position;

Fig. 3 is a top plan view of the machine, partly broken away;

Fig. 4 is a detailed section of the mechanism for supporting the centering device for the flat band casing;

Fig. 5 is a detail of one end of one of the spring strips used in constructing the expander;

Fig. 6 is a similar view of the end of a strip used alternately in the several layers with the strip shown in Fig. 5;

Fig. 7 is an enlarged section showing one method of securing the ends of the spring metal strips;

Fig. 8 is a section on line 8—8 of Fig. 7;

Figs. 9 and 10 are views similar to Fig. 7 but showing alternative methods of construction;

Fig. 11 is a view on line 11—11 of Fig. 7; and

Fig. 12 is a perspective view of a portion of the device shown in Fig. 9.

Generally speaking, the machine which I have shown as embodying the invention consists of a pair of movable heads, between which is bridged a flexible annular structure composed of laminations of spring metal strips so arranged as to present a substantially continuous surface. Preferably a blanket of rubber or other flexible and elastic material is placed over the strips, so as to provide them with a smooth surface capable of distributing the expanding force over the inner surface of the tire casing. As the heads are caused to approach each other the strips are bowed outwardly, forcing the covering blanket along with them and changing their shape from a low arch to substantially the shape of the interior of a tire. Coupled with this device is a means for holding the tire in expanded position without the assistance of the expanding device itself. The machine thus generally described will now be considered in detail.

Mounted on a base 20 is a pneumatic cylinder 21 having an end plate 22 which serves as a base and support for the rest of the expanding apparatus. This end plate is held to the base by tie bolts 23. Secured to the end plate is a stationary head 24 fitted with means to be described for supporting one end of the flexible strips. A second similar head 25 is carried upon a piston rod 26 sliding through a stuffing box 27 in the end plate and carrying a piston 28 running in the cylinder 21. Spacing rods 29 extending between the heads keep the latter in alignment and limit the closeness with which they can approach each other by means of enlarged portions 30 on the rods.

The expanding surface is formed of a plurality of laminations of narrow strips of spring metal 31. On account of the scale only one thickness has been shown in Figs. 1, 2 and 4, the preferred construction being shown in detail in the views on Sheet 3 of the drawings. The strips are arranged close together, as shown in Fig. 11, and the strips in successive layers are arranged so as to break joints, as is clearly shown in this figure. By this construction any gaps that are formed between the adjacent strips, when these are bowed into the position of Fig. 2, will be limited to a depth equivalent to the thickness of one strip and will also be comparatively narrow in width due to the small size of the individual strips.

One way of mounting the ends of the strips is shown in Fig. 7. The heads 24 and 25 are each provided with a recess 32 in which the ends of the strips fit closely, and the strips themselves are cut away so as to embrace bars 33 formed on a ring 34 which is held by screws or otherwise against one surface of the head. As shown in Figs. 5 and 6 the strips in one layer are provided with notches 35 and the strips in the next layer are provided with cut-away portions 36 at their sides which, when two strips are placed side by side, will form notches similar to the notches 35. This alternation of strips in the several layers is continued for as many thicknesses as may be desired, and secures the breaking of joints previously mentioned and shown clearly in Figs. 8 and 11. This construction allows the springs considerable play and gives them a pivotal connection at their ends without restricting their sliding one upon another. The several layers of strips form in effect a large laminated spring annulus, and, as with all laminated springs, the several members have a slight sliding motion upon each other. This can be provided by the construction already described or by alternative constructions.

Fig. 10 shows a construction quite similar to that of Fig. 7 except that the bars have been replaced by pins 37 fitting into holes 38 in the head and into holes 39 or notches in a face plate 40 attached to one side of the head. Figs. 9 and 12 show the springs as fitted in slots 41 in short rollers 42 held in place in suitably cut recesses 43 in the head and 44 in a ring 45 secured to the outer surface of the head. To prevent the spring strips shifting circumferentially in the casing the rollers are slotted only at 41, leaving central portions 70 (Fig. 12) which receive the notches 35 in the spring strips. In some cases it may be found that the ends of the springs bear upon the wall of the recess 43 with a resultant cutting of that wall. To avoid this it is useful either to close by a metal plate or otherwise the side of slots 41 which lies adjacent the wall of recess 43, or to surround the rollers with short sleeves 73 slotted on one side only as at 72.

It has been found desirable to prevent any chance of the strips buckling inwardly instead of outwardly by means of ring abutments 46 (Fig. 1) which are secured as by studs 47 to the heads. These rings bear upon the spring strips 31 when the heads are separated as in Fig. 1, and prevent any of the springs straightening out sufficiently to buckle in the wrong direction. As the heads are brought together to bow the springs outwardly these abutment rings are inactive as shown in Fig. 2.

In order to equalize still further the effect of the expander upon the inner surface of the tire, a rubber blanket 48 is kept in place over them. This blanket may be satisfactorily made out of a layer of vulcanized rubber of, say, one-eighth to one-fouth inch is thickness. At its edges this blanket is preferably fitted with enlarged portions or beads which are snapped over the sides of the heads and prevent the blanket from coming off. This blanket stretches as the spring annulus expands, and by its stretching equalizes the uneven strains that would otherwise be set up by the slightly separated mechanical expander elements.

In order to center the flat band casing, which in the drawings is indicated at $a$, a shelf 49 has been provided, resting, when the machine is in its contracted position of Fig. 1, upon a ring 50 attached to brackets 51 which are in turn secured to posts 52 by an adjusting screw 53. The posts are provided with enlarged heads 54 against which bears a coil spring 55, the other end of which bears against a bushing 56 screwed into a hole 57 in the head. The described construction permits a slight shifting of the support downwardly as the expander moves from the position of Fig. 1 to that of Fig. 2. This slight free motion is desirable in order to prevent the edge of the centering ledge from bearing heavily upon the spring strips and thereby causing an uneven shaping of the tire.

When the tire has been expanded as in Fig. 2, it is generally desired to place a fluid pressure bag within it. On account of the elasticity of the materials of which the tire is composed, the tire would tend, if unrestrained, to resume its flat form upon the release of the expanding force. In order to hold the tire expanded, even after the shaping mechanism has been retracted to the position of Fig. 1, I have provided means for grasping the tire by its outer periphery and holding it firmly at its increased diameter. This means preferably consists in a heavy rubber ring 58, the inner surface of which is coated with tacky rubber as, for example, uncured rubber applied in the form of a cement and then dried. This ring is made slightly smaller in internal diameter than the outer diameter of the expanded tire so that, as the tire is expanded, it will be forced firmly against the ring. The ring is supported on a ledge 59 held by posts 60 carried by springs 61 on brackets 62 rising from the base 20.

Means are also provided for stripping the expanded tire, together with the rubber ring, from the machine after the expander has resumed the position of Fig. 1. For this purpose the centering ledge 49 previously referred to is utilized. Sliding through holes in the ring are rods 63 (Fig. 1) secured firmly at their upper ends to the centering ledge, and carrying at their lower ends pistons 64 which run in pneumatic cylinders 65 carried on the base. If air pressure is introduced under the pistons, of which there are preferably three spaced evenly around the circumference of the expander, the ledge will be raised clear of the ring and will carry the expanded tire upwardly to a position where it can easily be removed from the machine by hand.

Having thus described my invention, I claim:

1. An expander for shaping flat band tire casings to tire form which comprises a plurality of layers of flexible strips arranged in annular assembly, the strips in the several layers being arranged so as to break joints, and means for bowing the strips outwardly.

2. An expander for shaping flat band tire casings to tire form which comprises a plurality of layers of flexible strips having their ends pivotally held in spaced heads so as to form an annular support, the strips in the several layers being arranged to break joints, means for bowing the strips outwardly, and a layer of flexible elastic material located about said members and serving to distribute their expansive force onto the inner surface of the tire band.

3. An expander for shaping flat band tire casings to tire form comprising a stationary head, a movable head, a pneumatic cylinder arranged to shift the movable head towards and away from the stationary head, and a plurality of layers of spring metal strips bridged between the two heads and pivotally held at their ends therein, the several layers of strips being superposed so as to break joints.

4. An expander for shaping flat band tire casings to tire form comprising a pair of heads, means to cause relative axial motion between the heads, spring metal strips bridged between the two heads and pivotally held at their ends therein, and circular abutments positioned within the series of strips and adapted to prevent said strips from buckling inwardly when the heads approach each other.

5. An expander for shaping flat band tire casings to tire form which comprises a discontinuous annulus, a layer of flexible elastic material located about said annulus, and means for shifting said annulus so as to shape the elastic material to substantially tire form.

6. An expander for shaping flat band tire casings to tire form which comprises a plurality of flexible members arranged in annular assembly, means for bowing the members outwardly, and a layer of flexible elastic material located about said members and serving to distribute their expansive force onto the inner surface of the tire band.

7. An expander for flat band tire casings comprising means to shape a flat band to tire form and a flexible ring having an adhesive inner surface against which the casing is expanded and which holds the casing expanded after withdrawal of the shaping means.

THOMAS MIDGLEY.